No. 639,098. Patented Dec. 12, 1899.
J. P. SCHMITZ.
KNEADING MACHINE.
(Application filed Aug. 20, 1898.)

(No Model.) 2 Sheets—Sheet 1.

Witnesses:
Jas. E. Hutchinson.
W. J. Williamson.

Inventor.
John P. Schmitz, by
Prindle and Russell, his Attys.

THE NORRIS PETERS CO., PHOTO-LITHO., WASHINGTON, D. C.

No. 639,098. Patented Dec. 12, 1899.
J. P. SCHMITZ.
KNEADING MACHINE.
(Application filed Aug. 20, 1898.)

(No Model.) 2 Sheets—Sheet 2.

Witnesses:
Jas E. Hutchinson.
R. J. Williamson.

Inventor.
John P. Schmitz, by
Prindle and Russell, his Attys

UNITED STATES PATENT OFFICE.

JOHN P. SCHMITZ, OF AURORA, ILLINOIS.

KNEADING-MACHINE.

SPECIFICATION forming part of Letters Patent No. 639,098, dated December 12, 1899.

Application filed August 20, 1898. Serial No. 689,102. (No model.)

*To all whom it may concern:*

Be it known that I, JOHN P. SCHMITZ, of Aurora, in the county of Kane, and in the State of Illinois, have invented certain new and useful Improvements in Kneading-Machines; and I do hereby declare that the following is a full, clear, and exact description thereof, reference being had to the accompanying drawings, in which—

Figure 1:
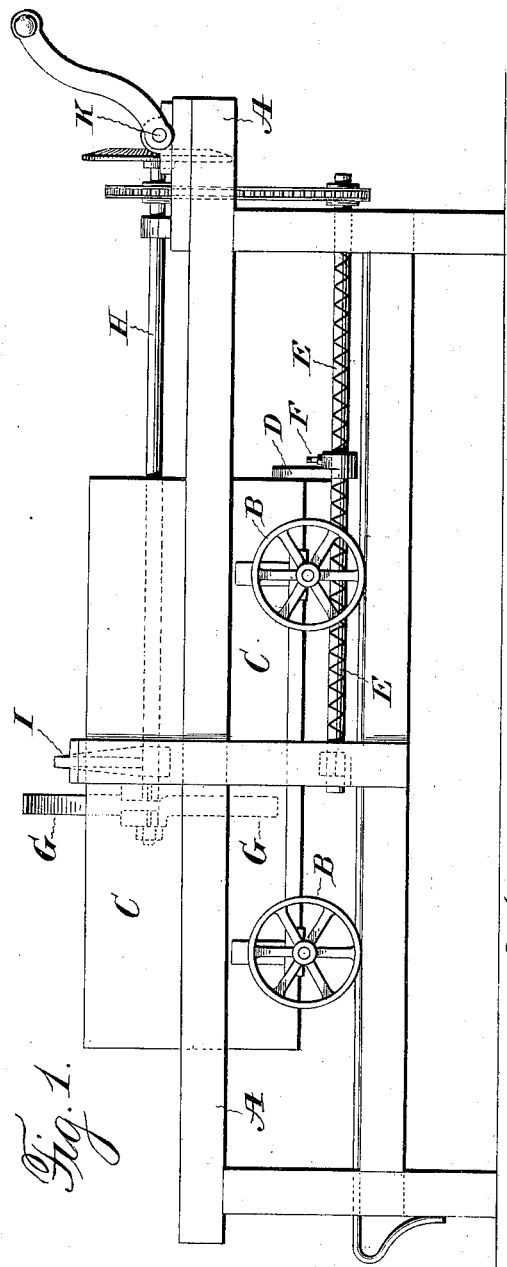
Figure 2:
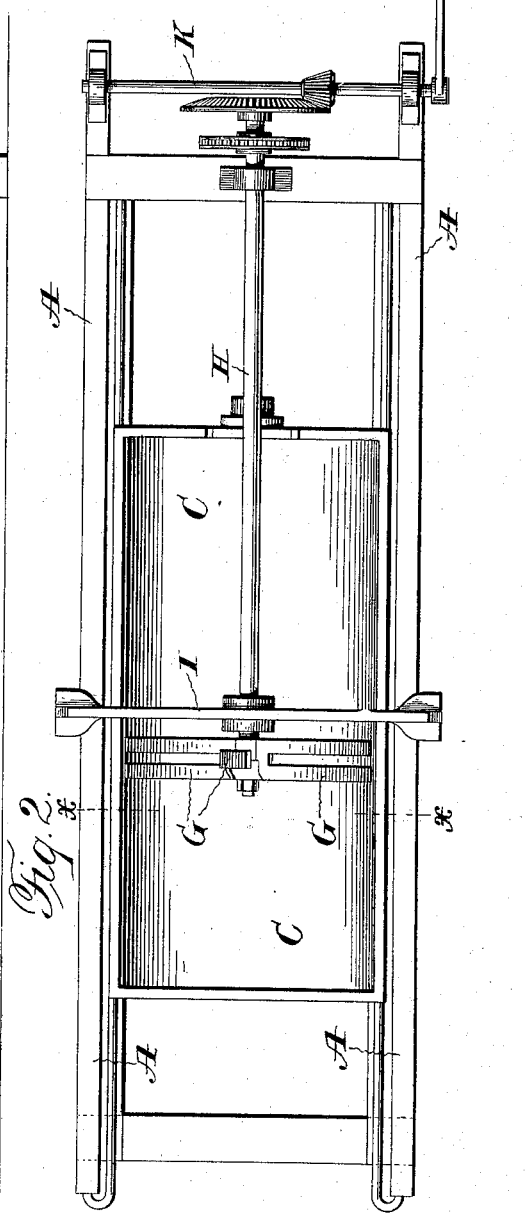
Figure 3:
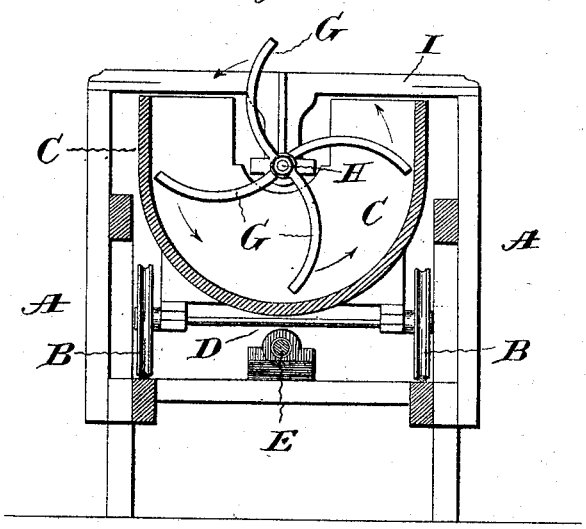
Figure 4:
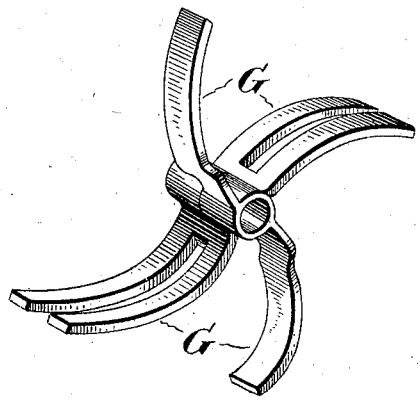

Figure 1 is a side elevation of my machine. Fig. 2, a top plan view thereof; Fig. 3, a cross-section on the line x x of Fig. 2, and Fig. 4 a detail perspective view of the kneading-arms.

Letters of like name and kind refer to like parts in each of the figures.

The object of my invention is to simplify the structure and to increase the efficiency and ease of operation of kneading-machines; and to this end said invention consists in the kneading-machine having the features of construction substantially as hereinafter specified.

The type of machine which I have improved is that in which the receptacle or trough for the dough is caused to travel along as the kneading devices operate, so as to present the dough to the action of said devices; and in the carrying of my invention into practice I employ a frame A, preferably of wood, composed of longitudinal and transverse bars or beams. Two of the longitudinal beams are provided with rails or tracks for carrying wheels B and B, upon which the trough C is supported. Said trough is substantially semicircular in cross-section, with its opposite ends closed, and at one end is a plate or bracket D, that projects below the bottom of the trough and has an opening through which passes a shaft E, journaled in suitable bearings on the frame A. The shaft E has two threads, respectively right and left, with which the inner end of a screw F, tapped through an opening in the bracket D, engages and in a well-known manner causes the trough to move longitudinally in one direction or the other, according to the direction of revolution of the shaft. The means for revolving said shaft will be presently described.

The kneading devices consist of radially-extending arms G and G, preferably four in number, fastened to a shaft H, that extends parallel with the screw-shaft and is journaled at one end by a bearing on one of the end cross-bars of the frame A and at the other end by a bearing depending from a cross-bar I, that is suitably supported above the trough. Each of the arms G is bent or curved in the plane of its revolution, its convex side being toward the direction in which it revolves, and alternate ones are slotted longitudinally, and the other two being each as wide as and in line with the slot in one of the slotted arms. The curved form and direction of revolution of the arms tends to draw the dough away from the surface of the trough inward or under the arms, and as it at the same time is carried around in the direction of revolution of the arms it results that it is subjected to a thorough mixing or kneading action. The slotting of certain arms and the arrangement of alternate arms out of alinement also materially contributes to the kneading operation. The axis of the arms is preferably not concentric with the trough, but is slightly above the center of curvature of the latter, and this aids the turning over or mixing of the mass of dough, and in addition to the form of the arms avoids any mere scraping action and the simple carrying of the mass around bodily with the arms in the direction of their revolution.

The similar pairs of arms are together connected to a hub or collar, by which they are fastened to the shaft, and if at any time it is desirable to lessen the number of arms—when, for example, the dough is very stiff and is hard to knead—such can very readily be done by loosening the screw by which the collar is fastened to the shaft.

As shown, the two shafts E and H are geared together by sprocket-gearing, and power is applied to the shaft H from a drive-shaft K by an arrangement of bevel-gears, but of course any desired way of applying power to revolve the kneading-arms and cause the trough to travel longitudinally may be used and by means of manual or other power.

It will be seen that by the continued revolution of the drive-shaft in the same direction the trough will be moved back and forth automatically, its direction of travel being changed automatically at each limit of its movement.

Having thus described my invention, what I claim is—

1. In a kneading-machine, the combination of a traveling trough, a worm-shaft journaled beneath the trough, a bracket on the trough through which said shaft passes, a part projecting from the bracket into the thread of the shaft, kneading-arms, a shaft carrying them, means to rotate said shaft, and gearing between said shaft and the worm-shaft, substantially as and for the purpose described.

2. In a kneading-machine, the combination of kneading devices, a trough movable to and fro, a shaft having right and left threads beneath the trough, and a part on the trough to engage such threads, substantially as and for the purpose set forth.

3. In a kneading-machine, the combination of a dough-receptacle and kneading devices consisting of revolving arms having surfaces bent or curved in the plane of their revolution, alternate arms being slotted, with the slots in line with the other arms, substantially as and for the purpose shown.

4. In a kneading-machine, the combination of a dough-receptacle, and kneading devices consisting of a circular series of revolving arms, alternate ones being longitudinally slotted, with the slots in line with the other arms, substantially as and for the purpose described.

In testimony that I claim the foregoing I have hereunto set my hand this 30th day of July, 1898.

JOHN. P. SCHMITZ.

Witnesses:
  JOHN B. NILLES,
  GEORG MANNES.